(12) United States Patent
Netzel et al.

(10) Patent No.: US 6,574,098 B2
(45) Date of Patent: Jun. 3, 2003

(54) HANDHELD COMPUTER CASING WITH GROOVED FEATURE FORMED ON A DECORATIVE SURFACE

(75) Inventors: Zita Netzel, Campbell, CA (US); Brent Eikanas, San Jose, CA (US); Maaike Evers, San Francisco, CA (US); Michael Ryner, Brentwood, CA (US); Lawrence Lam, San Jose, CA (US)

(73) Assignee: Palm, Inc., Santa Clara, CA (US)

( * ) Notice: Subject to any disclaimer, the term of this patent is extended or adjusted under 35 U.S.C. 154(b) by 2 days.

(21) Appl. No.: 09/957,195

(22) Filed: Sep. 19, 2001

(65) Prior Publication Data

US 2003/0053288 A1 Mar. 20, 2003

(51) Int. Cl.$^7$ .................................................. H05K 7/02
(52) U.S. Cl. ..................... 361/683; 361/687; 312/223.2; 345/168; 710/303
(58) Field of Search ................................. 361/683–687; 312/223.1–223.6; 345/168–172, 905; 400/489, 693; 710/303–304

(56) References Cited

U.S. PATENT DOCUMENTS

| | | | | |
|---|---|---|---|---|
| 6,445,577 B1 | * | 9/2002 | Madsen et al. | 361/683 |
| 6,480,377 B2 | * | 11/2002 | Genest et al. | 361/686 |
| 6,504,708 B2 | * | 1/2003 | Yehudai | 361/683 |

* cited by examiner

*Primary Examiner*—Darren Schulberg
*Assistant Examiner*—Hung Van Duong
(74) *Attorney, Agent, or Firm*—Van Mahamedi; Hickman Palermo Truong & Becker LLP

(57) ABSTRACT

A housing component is provided for a handheld computer. A film layer corresponds to an exterior surface of the housing component. The film layer may have a first tone and a second tone. A groove is formed on the film layer. The groove has a contoured interior. The first surface on the interior of the groove may have the first tone. A second surface on the interior of the groove may have the second tone.

43 Claims, 4 Drawing Sheets

US 6,574,098 B2

HANDHELD COMPUTER CASING WITH GROOVED FEATURE FORMED ON A DECORATIVE SURFACE

FIELD OF THE INVENTION

The present invention relates to handheld computers. In particular, the present invention relates to a decorative casing for a handheld computer.

BACKGROUND OF THE INVENTION

Handheld computers, typically referred to as personal digital assistants (PDAs), are mobile devices that can be carried by individuals as accessories. For this reason, users often pay attention to a style or appearance of a handheld computer.

Designs for handheld computers can be personalized in many ways. Some handheld computers, such as the PALM m 100 organizer, manufactured by PALM INC., allow users to purchase attachable faceplates for their organizers. The face plates have colorful designs and decors.

Handheld computers may also have decorative designs that are painted on a housing surface. In addition, encasement materials can be changed, or formed to have a certain style. For example, PALM V organizer, manufactured by PALM INC., can have attachable encasements made of materials such as titanium.

A process termed In Mold Design (IMD) is increasingly used to form devices having decorative surfaces. The IMD process allows for a decorative substrate to be used during a molding process. The substrate then forms an exterior surface of the device.

SUMMARY OF THE INVENTION

A housing component is provided for a handheld computer. The housing component is formed from a layer that provides an exterior surface for the housing component. The layer may have a first tone and a second tone. A groove is formed on the layer. The groove has a contoured interior.

In one embodiment, a first surface on an interior of the groove has the first tone. A second surface on the interior of the groove has the second tone. The presence of the first tone and second tone in the groove enhance a perception that the surface of the handheld computer is really made from two materials.

The first and second tone may correspond to colors, patterns or other designs. In one application, the groove forms a separation between a light color and a dark color.

In another embodiment, the groove is formed on a film during an In Mold Design process. The remainder of the housing component is formed in a molding process that incorporates the film. The groove distinguishes the color and/or design patters on the housing component for the handheld computer.

BRIEF DESCRIPTION OF THE DRAWINGS

Embodiments of the invention are illustrated by way of example, and not by way of limitation, in the figures of the accompanying drawings. Like reference numerals are intended to refer to similar elements among different figures.

DETAILED DESCRIPTION OF THE INVENTION

Figure 1:
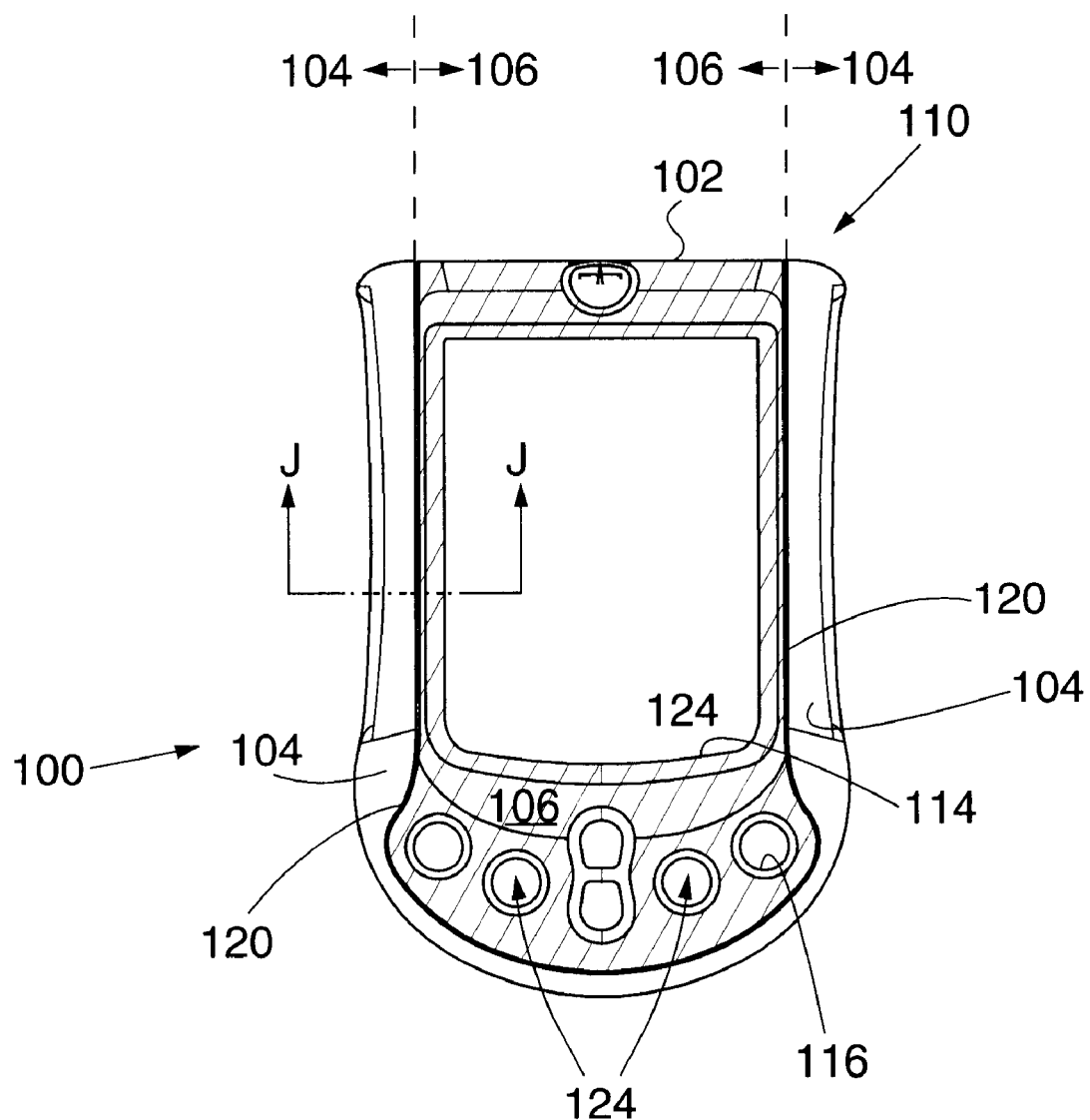
FIG. 1 is a frontal view of a housing component having a decorative groove, under an embodiment of the invention.

Embodiments of the invention provide for a handheld computer having a decorative housing component. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A. Overview

Embodiments of the invention provide a decorative housing component for a handheld computer. An exterior surface of the housing component includes a groove and two or more decorative designs. The decorative designs are unitarily formed on the same layer, so that the layer is homogeneous. Therefore, the different decorative designs are not created by use of paint or separate materials. Rather, the decorative design is formed using a molding process.

Homogenous material refers to a material that is chemically bonded. The homogenous material is inseparable unless the chemical bonds are destroyed. The homogeneous layer does not refer to a layer that has a coat of paint applied on it after it is formed.

The term design refers to a distinct visual appearance. A design may include a tone, a shade, a color, or a plurality of tones, shades and/or colors arranged into a pattern.

The housing component may be an integral part of the handheld computer. For example, the housing component may correspond to a front panel of the handheld computer, where the display and buttons of the handheld computer are provided. Alternatively, the housing component may be separable from an exterior of the handheld computer. For example, the housing component may correspond to a detachable faceplate for the handheld computer.

In another embodiment, a layer is formed to provide an exterior surface for the housing component. The layer includes a first tone and a second tone. A groove is formed on the layer. The groove has a contoured interior. A first surface on the interior of the groove has the first tone, and a second surface on the interior of the groove has the second tone.

According to another embodiment, handheld computers and housing components for handheld computers include external surfaces formed from a single homogenous material having unique decorative features. The decorative features may include two color or shade designs separated by a groove. The groove gives the perception that the exterior surface is formed from two materials, rather than a single homogenous material.

Several advantages are provided by embodiments described herein. A perception may be given to the user that the handheld computer is formed from two distinct materials or layers, when in fact one homogenous material is used to form the exterior surface. The perception that the handheld computer is formed from two materials enhances the marketing of the product. This perception can also be used to make the product look slimmer, and more expensive. However, by using a single homogenous material, costs are avoided that would otherwise be associated with tooling and assembling two materials into one exterior surface for the handheld computer. For example, labor and material costs are saved in comparison to having the exterior surface painted in a similar configuration. The homogenous material with the groove also enables a manufacturing process to be implemented that produces a consistent quality for the decorative design when repeated for numerous products in a product line.

B. Grooved Housing Component

FIG. 1 is a frontal view of a housing component for a handheld computer having a decorative groove, under an embodiment of the invention. Referring to FIG. 1, a housing component 110 is provided for a handheld computer 100. The housing component 110 may correspond to a front panel of handheld computer 100. Alternatively, as described with FIG. 5, the housing component 110 may correspond to a surface of a faceplate 150 for handheld computer 100.

A front surface 112 of housing component 110 includes a groove 120. The groove 120 is formed into an exterior surface of housing component 110. The exterior surface may correspond to a front surface 112, where several input and output features are provided.

The housing component 110 includes a display opening 114 and a plurality of button openings 116. The display opening 114 provides access to a display 122 on front surface 112. The display 114 can be mounted to an interior of handheld computer 100. Each of the button openings 116 provide access to a plurality of buttons 124 on front surface 112.

The groove 120 traces a shape on front surface 112. In one embodiment, the shape is a partial polygon. The groove 120 circumvents display 114 and the plurality of buttons 116. The partial polygon formed by the shape of groove 120 has an open end. In an embodiment shown, the open end of the partial polygon corresponds to a top surface 102 of handheld computer 100.

On an exterior side 104 of groove 120, housing component 110 has a first design. The housing component 110 has a second design on an interior side 106 of housing component 110. The first design may correspond to a color, shade, tone or pattern. The second design may be different than the first design, so as to correspond to another color, shade, tone or pattern. In one application, the exterior side 104 has a dark shade or color, and the interior side 106 has a light color or shade. For example, the exterior side 104 may be black, and the interior side 106 may be light blue. By featuring a dark color on the exterior side 104 of groove 120, and a light color on the interior side 106, a perception can be created that handheld computer 100 is smaller than it actually is.

Figure 2:
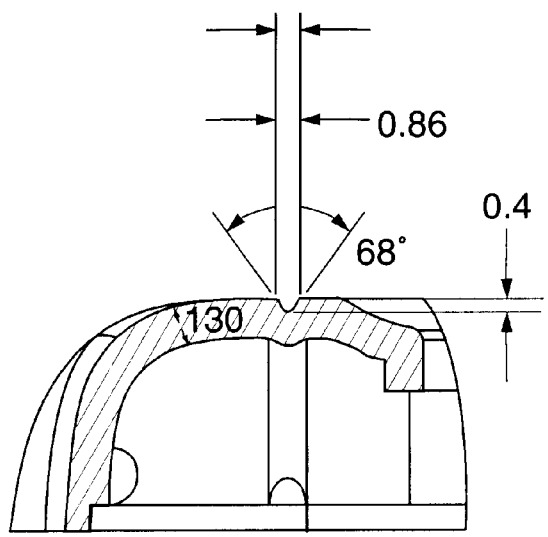
FIG. 2 is a cross-sectional view along lines J—J of FIG. 1, showing an interior of the groove.

FIG. 2 is a cross-sectional view along lines J—J of FIG. 1, showing an interior of groove 120. The housing component 110 includes a layer 130. The layer 130 is homogenous so that its material is chemically bonded. Groove 120 is formed on layer 130. Underneath groove 120, the layer 130 has a contoured concavity corresponding to the groove's location.

In an application for a front surface of housing component 110, the width of groove 120 may range between 0.6 and 1.0 millimeters. The depth may range between 0.2 and 0.6 millimeters. In one embodiment, groove 120 has a width of 0.86 millimeters, and a depth of about 0.4 millimeters. The term "about" means plus or minus 10% of the dimension. Embodiments of this invention are not intended to be limited to the specific dimensions and dimension ranges made explicit in this application.

Figure 3:
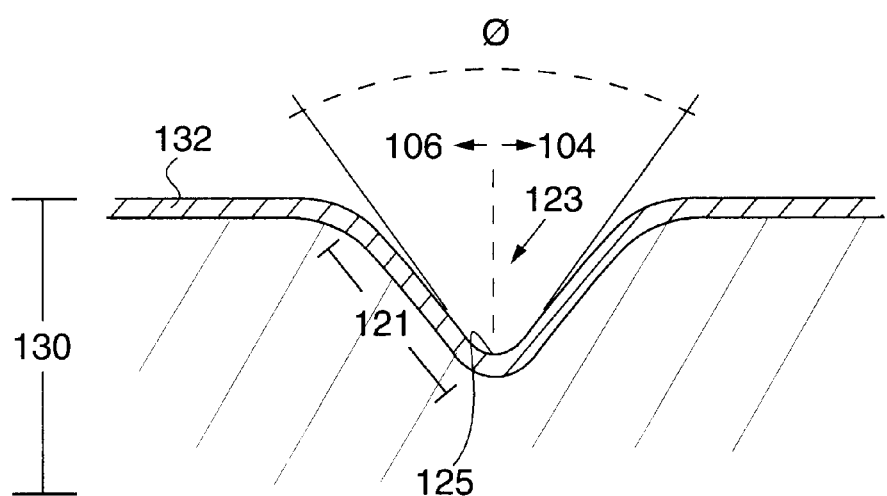
FIG. 3 is an enlarged view of a groove for a housing component, under an embodiment of the invention.

FIG. 3 is an enlarged view of groove 120, under an embodiment of the invention. The groove 120 is shown as a feature formed into a film layer 132. Underneath film layer 132, layer 130 may have a corresponding shape to accommodate groove 120.

As will be described in FIG. 4, film layer 132 may comprise a polycarbonate material that is subjected to a subsequent molding process where the remainder of layer 130 is formed. The remainder of layer 130 may be formed from moldable material, such as plastic, that is formed onto the film layer 132. The film layer 132 is outwardly positioned on layer 130, and the moldable material is formed inward. The mold is such that the resulting layer 130 is chemically bonded into one homogenous material.

The thickness of film layer 132 may range between 0.1 and 0.6 millimeters. In one embodiment, a thickness of film layer 132 is about 0.3 millimeters. The dimensions of layer 130 may range between 1 and 3 millimeters. In one embodiment, a thickness of layer 130 is about 1.5 millimeters. Embodiments of this invention are not intended to be limited to specific dimensions for film layer 132 and layer 130.

The groove 120 includes an interior 128 formed from a first side 121 and a second side 123. The first and second side 121 and 123 join to form a trough 125. In an embodiment, trough 125 is contoured, or rounded. The contoured shape of groove 120 facilitates the film layer 132 to be subjected to an IMD process, where moldable material is formed onto the material.

In an embodiment, first side 121 and second side 123 combine to form an angle of between 55–75 degrees. In one application, the angle is about 68 degrees.

In addition, an embodiment provides that interior 128 of groove 120 includes two designs. For example, the interior 128 of groove 120 may provide for two colors formed on film layer 132 that adjoin within groove 120. The colors may adjoin at or near trough 125. One embodiment provides that first side 121 has a first design, and second side 123 has a second design. For example, first side 121 may be of a dark color, and second side 123 may be of a light color. The trough 125 is positioned approximate to where the two designs adjoin one another.

As shown, groove 120 can trace a geometric pattern on exterior surface 112 of handheld computer 100. The pattern may require groove 120 to be extended over edges of housing component 110. For example, groove 120 may be extended over a top of housing component 110. To accommodate the bend when transitioning from the top of handheld computer 100 to its side, the depth of groove 120 may be tapered. The tapering of groove 120 may reduce its depth.

C. Manufacturing Process For Forming Grooved Housing Segment

Figure 4:
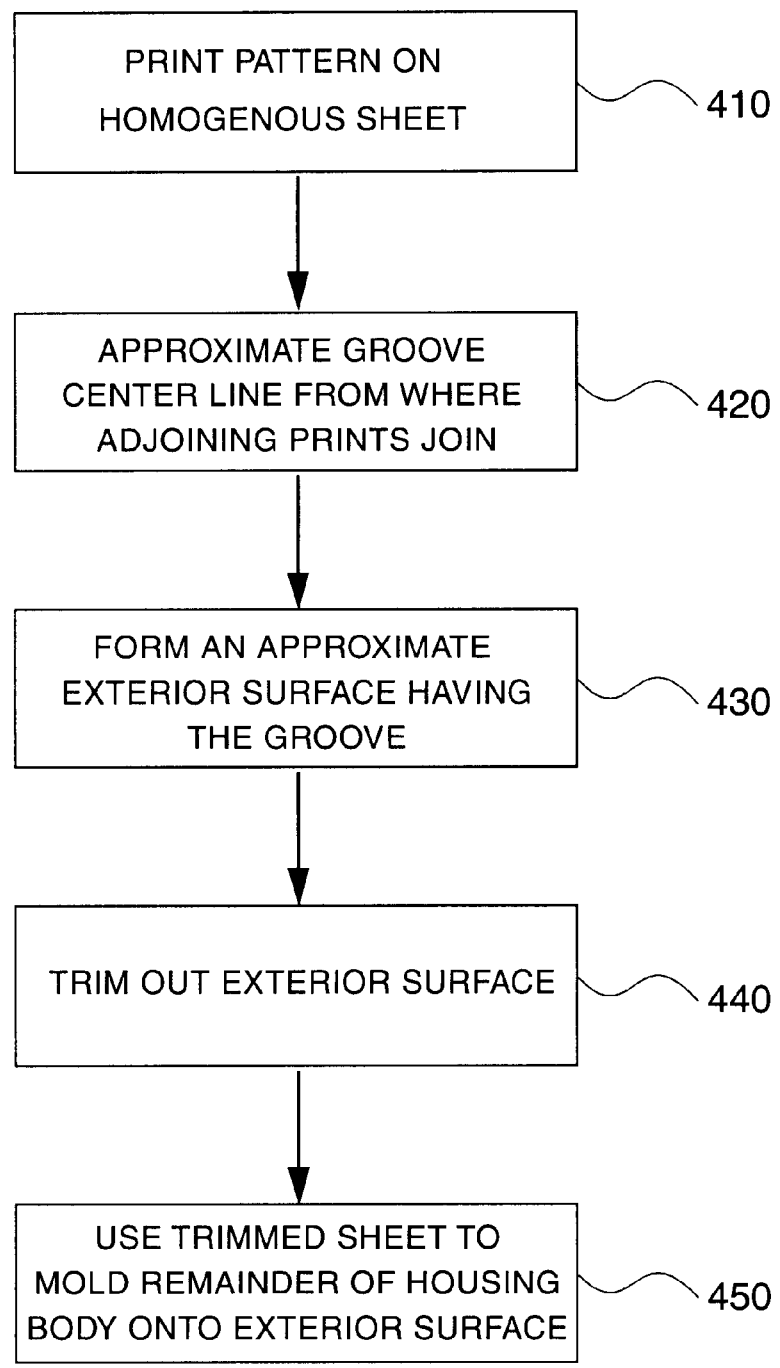
FIG. 4 is a process for forming a housing component with a decorative groove, under an embodiment of the invention.

FIG. 4 described a process for forming decorative housing component 110, under an embodiment of the invention. The groove may extend along a shape on an exterior surface of housing component 110, and serve to separate designs appearing on the exterior surface. Reference to elements of FIGS. 1–3 is intended for illustrative purposes, and not intended to limit the invention.

In step 410, a pattern is printed or otherwise provided on a sheet of homogenous material. The sheet is suitable for IMD. That is, the sheet can be used as the exterior surface of a structure formed during a molding process. In one embodiment, the sheet is formed from a polycarbonate material, and includes two or more distinct designs. The designs may adjoin one another on the sheet along a line. The line may form a geometric pattern on the sheet.

In step 420, the location for the center of groove 120 is approximated. The groove 120 center may correspond to the line where the two designs adjoin one another. The center of groove 120 may also correspond or approximate the location of trough 125.

In step 430, the sheet is formed into an approximate exterior surface for housing component 110. In this step, groove 120 may be formed into the sheet. The approximate shape of the exterior surface may correspond to a front panel of handheld computer 100, or to a front face of faceplate 150 (See FIG. 5). The exterior surface may only be an approximation of the final form, in that it may lack display opening 114, or button openings 116. In addition, there may be extra edge material that can be removed.

In step 440, the approximate exterior surface is trimmed out. The trimmed, exterior surface may correspond to film 132, of housing component 110. Trimming the exterior surface may include forming the display opening 114 and button openings 116, as well as removing extra edge material.

In step 450, the trimmed sheet is used to mold the remainder of layer 130. This may be done using an IMD process. In the IMD process, film 132 is placed into a mold for housing component 110. Moldable material is poured onto the mold. The moldable material forms the remainder of layer 130. The moldable material is formed underneath film 132, so that film 132 corresponds to exterior surface 112.

D. Faceplate Configuration for Handheld Computer

Figure 5:
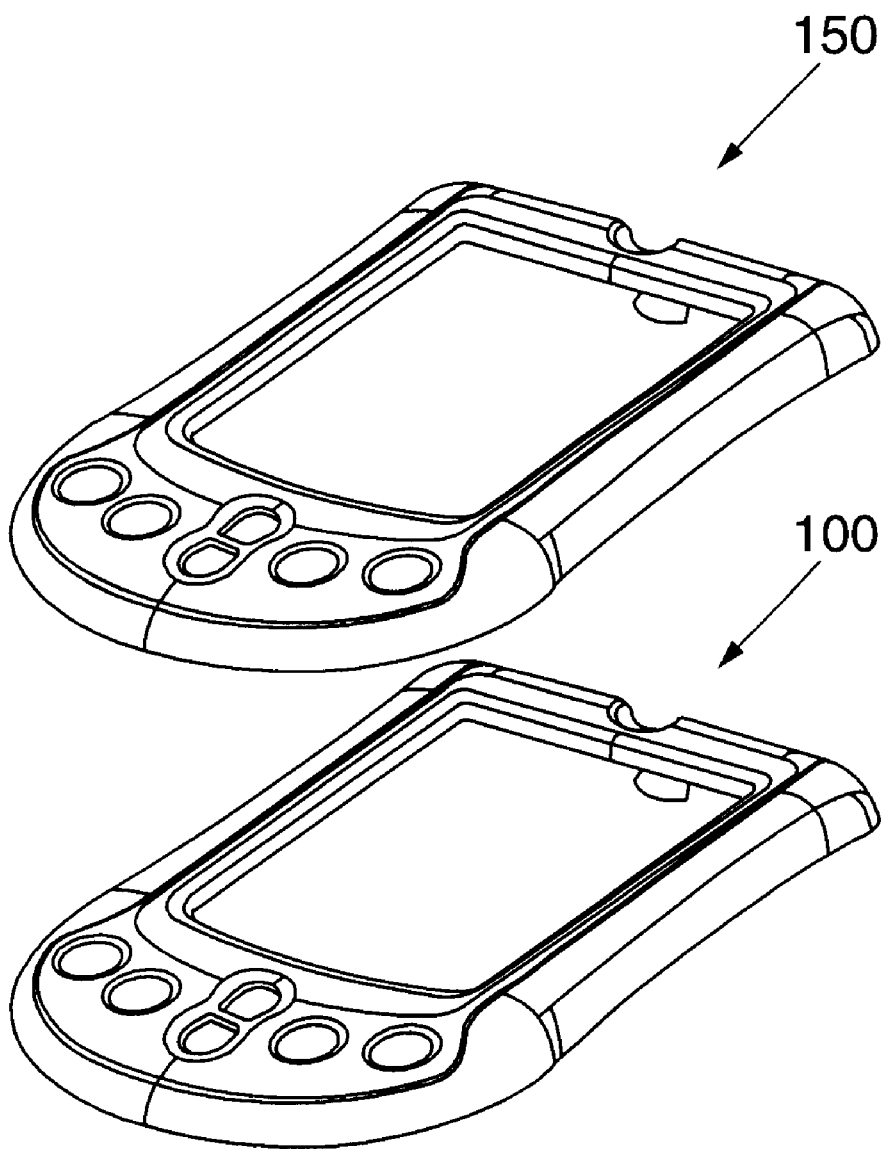
FIG. 5 illustrates a face plate configuration for a housing component with the decorative groove.

FIG. 5 illustrates a face plate configuration for a housing component with the decorative groove. In an embodiment, housing component 110 may be a faceplate 150 that is coupleable to handheld computer 100. One or both of faceplate 150 and handheld computer 100 may incorporate the groove 120 and design feature described in FIG. 1.

E. Alternative Embodiments

While embodiments described herein provide for a housing component of a handheld computer, other embodiments may apply to other kinds of devices. In particular, accessory devices for handheld computers may be provided similar decorative features such as described with FIGS. 1–5.

The groove 120 may incorporate numerous geometric shapes. The particular partial polygon shown may be replaced by other polygons and shapes. In addition, multiple grooves may be provided that separate more than two designs.

F. Conclusion

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A housing component for a handheld computer, the housing component comprising:

a layer providing an exterior surface for the housing component, the layer having a first tone and a second tone;

a groove formed on the layer, the groove having a contoured interior, wherein a first surface on the interior of the groove has the first tone, and a second surface on the interior of the groove has the second tone.

2. The housing component of claim 1, wherein the layer comprises a film and a material formed onto the film, the film forming the exterior surface.

3. The housing component of claim 1, wherein the interior of the groove is contoured at a trough of the groove, and the trough approximately bisects where the first surface having the first tone adjoins the second surface having the second tone.

4. The housing component of claim 1, wherein the first tone is a first color, and the second tone is a second color.

5. The housing component of claim 1, wherein a depth of the groove is between 0.2 and 0.6 millimeters.

6. The housing component of claim 1, wherein a width of the groove is between 0.6 and 1.0 millimeters.

7. The housing component of claim 1, wherein the first surface and the second surface of the groove form an angle of between 55–75 degrees.

8. The housing component of claim 2, wherein the film is a polycarbonate material, and the material is molded onto the material.

9. The housing component of claim 7, wherein the first surface and the second surface of the groove form an angle of between 65–70 degrees.

10. The housing component of claim 8, wherein the exterior surface of the layer is formed from a polycarbonate sheet that is designed to include the first tone and the second tone.

11. A method for forming a decorative housing component for a handheld computer, the method comprising:

on a material comprising a design of multiple tones, identifying a region where two of the multiple tones adjoin in the design;

forming the material into a portion of the housing;

forming a groove on the identified region of the formed material where two or more tones adjoin so that each of the two tones in the design extend at least partially into the groove, the groove being disposed on an exterior side of the housing component; and forming a remainder of the housing surface onto the formed material, with the surface corresponding to the exterior side being outwardly disposed.

12. The method of claim 11, wherein forming a groove on the identified region includes forming the groove to include a contoured trough.

13. The method of claim 11, further comprising forming an opening on the material corresponding to at least a portion of the display for the handheld computer.

14. The method of claim 11, further comprising forming a plurality of openings corresponding to a region where a plurality of buttons are to extend from the housing surface.

15. The method of claim 11, wherein forming a remainder of the housing surface from the material includes forming a faceplate for the handheld computer.

16. The method of claim 11, wherein forming a remainder of the housing surface from the material includes forming a front panel for the handheld computer.

17. The method of claim 11, wherein forming a remainder of the housing surface from the material includes placing the shaped material into a mold for forming the remainder of the housing.

18. The method of claim 11, wherein the shaped material has a thickness of between 0.1 millimeters and 0.6 millimeters.

19. The method of claim 11, wherein a depth of the groove is between 0.2 and 0.6 millimeters.

20. The method of claim 11, wherein a width of the groove is between 0.6 and 1.0 millimeters.

21. The method of claim 11, wherein forming a groove includes forming a contoured trough on an interior of the groove, and shaping a first side of the interior to form an angle of between 55–75 degrees with a second side of the interior.

22. The method of claim 11, wherein forming a contoured trough on an interior of the groove includes shaping the first side of the interior to form the angle of about 65–70 degrees with the second side of the interior.

23. The method of claim 11, wherein the step of forming a groove on the identified region is performed concurrently with the step of forming the material into a portion of the housing.

24. The method of claim 12, wherein forming a groove on the identified region includes extending the groove on the surface corresponding to the exterior side in at least a partial polygonal shape.

25. The method of claim 14, wherein steps of forming the opening corresponding to the display and the plurality of openings corresponding to the plurality of buttons are performed before forming a remainder of the housing surface.

26. The method of 18, wherein the shaped material has a thickness of about 0.3 millimeters.

27. The method of claim 19, wherein the depth of the groove is about 0.4 millimeters.

28. The method of claim 20, wherein the width is between about 0.85 and 0.90 millimeters.

29. The method of claim 21, wherein the first side has a first one of the multiple tones, and the second side has a second one of the multiple tones.

30. A handheld computer comprising:
   a housing;
   a layer providing an exterior surface for the housing, the layer having a first tone and a second tone;
   a groove formed on the layer, the groove having a contoured interior, wherein a first surface on the interior of the groove has the first tone, and a second surface on the interior of the groove has the second tone.

31. A component for a housing of a handheld computer, the component comprising:
   a layer providing an exterior surface for the component, the layer having a first tone and a second tone;
   a groove formed on the layer, the groove having a contoured interior, wherein a first surface on the interior of the groove has the first tone, and a second surface on the interior of the groove has the second tone.

32. The component of claim 31, wherein at least a portion of the exterior surface includes the first tone and the second tone.

33. The component of claim 31, wherein the groove is shaped into at least a partial polygonal configuration on the surface.

34. The component of claim 31, wherein the exterior surface is part of a face plate that can be attached to the handheld computer.

35. The component of claim 31, wherein the surface is part of a housing for the handheld computer.

36. A face plate for a handheld computer, the face plate comprising:
   a layer formed on the housing component to form an exterior portion of the face plate, the layer being formed from moldable material combined with a grooved film, the layer having a first tone and a second tone;
   wherein the groove includes an interior having a first portion in a first tone, and a second portion in a second tone; and
   a coupling mechanism to detachably couple the face plate to the handheld computer so that the layer can form a portion of an exterior surface for the handheld computer.

37. The face plate of claim 36, further comprising a plurality of openings for housing buttons of the handheld computer when the face plate is coupled to the handheld computer.

38. The face plate of claim 36, further comprising an opening to provide access to a display of the handheld computer when the face plate is coupled to the handheld computer.

39. A component for a housing of a handheld computer, the component comprising:
   a homogenous layer providing an exterior surface for the component, the homogenous layer having a first tone and a second tone; and
   a groove formed on the layer, the groove separating the first tone from the second tone.

40. The component of claim 39, wherein the groove and the homogenous layer combine to provide a perception that the housing is formed from two distinct materials.

41. The component of claim 39, wherein the homogenous layer is at least partially formed from a molding process.

42. The component of claim 39, wherein the groove is formed at least into a partially polygonal shape on the exterior surface.

43. The component of claim 41, wherein the homogenous later is formed from combining a polycarbonate sheet having a groove to separate two or more tones with a molding process to add material to the polycarbonate sheet, a surface of the polycarbonate sheet forming the exterior surface.

* * * * *